(No Model.)
W. R. STAFFORD.
CORNSTALK CUTTER.
No. 349,822. Patented Sept. 28, 1886.
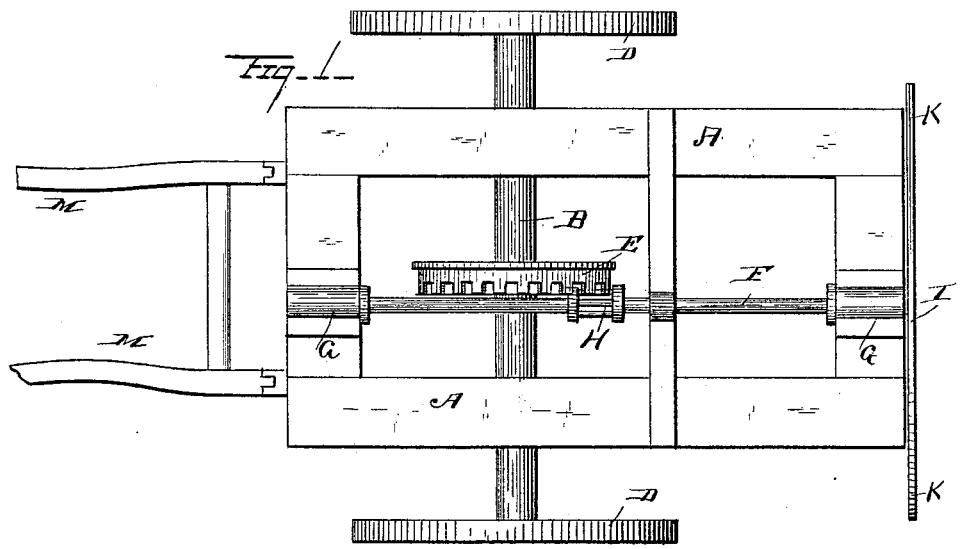
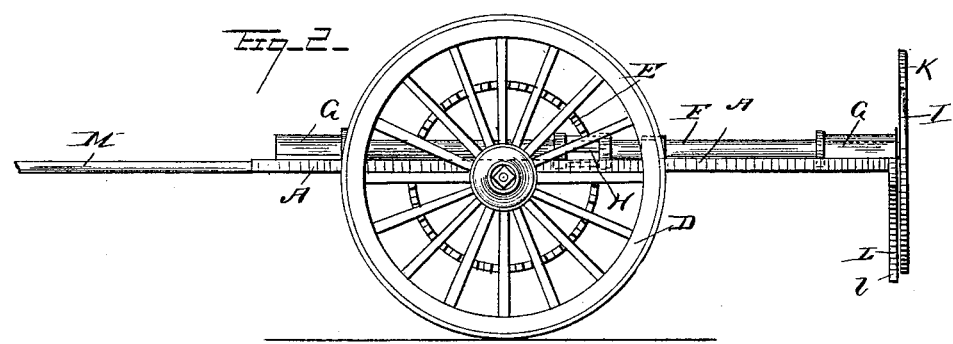
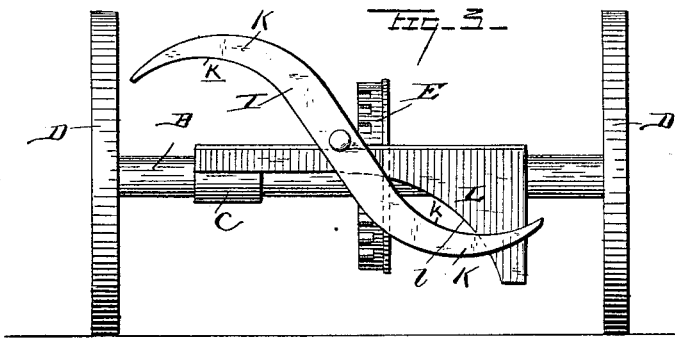
Witnesses
Wm. T. Gill
E. G. Siggers
Inventor
Wm. R. Stafford
By his Attorneys
C. A. Knowles

UNITED STATES PATENT OFFICE.

WILLIAM R. STAFFORD, OF SCANDIA, KANSAS.

CORNSTALK-CUTTER.

SPECIFICATION forming part of Letters Patent No. 349,822, dated September 28, 1886.

Application filed May 20, 1886. Serial No. 202,790. (No model.)

*To all whom it may concern:*

Be it known that I, WILLIAM R. STAFFORD, a citizen of the United States, residing at Scandia, in the county of Republic and State of Kansas, have invented a new and useful Improvement in Cornstalk-Cutters, of which the following is a specification.

My invention relates to an improvement in machines for cutting cornstalks; and it consists in the peculiar construction and combination of devices, that will be more fully set forth hereinafter, and particularly pointed out in the claims.

In the drawings, Figure 1 is a top plan view of my invention. Fig. 2 is a side elevation of the same. Fig. 3 is a rear elevation.

A represents a rectangular frame, which is provided with a transverse shaft, B, that is journaled in bearing-boxes C, secured on the under side of the shaft. To each end of the shaft B is attached a driving and supporting wheel, D, and to the center of the said shaft is attached a miter gear-wheel, E.

F represents a longitudinal rotating shaft, which is journaled in blocks G, that are secured on the upper side of the frame A. This shaft is provided with a pinion, H, that meshes with the wheel E, and to the rear end of the said shaft is attached a cutter, I, which is provided with curved arms K, extending outwardly in opposite directions from the shaft, thereby giving the cutter substantially the shape of the letter S. The inner edges, k, of the curved arms are sharpened.

L represents a vertical cutter, which depends from the rear end of the frame A. The lower end of the said cutter is rounded, and the inner side of the cutter is curved, as at l, and sharpened.

A tongue, M, or suitable thills, is attached to the frame A, to permit the machine to be drawn by a horse or other animal.

It will be readily understood that as the machine is drawn along the rotation of the shaft B is communicated to the shaft F through the wheels E and H, thereby causing the cutter I to rotate on the rear end of the frame. As the arms of the cutter sweep around, they collect the cornstalks lying on the ground and compress the same between the edges k of the cutter I and the edge l of the cutter L, thereby severing the cornstalks, and as the cutter I rotates at a considerable rate of speed, by reason of the pinion H being much smaller than the wheel D, it follows that the cornstalks will be cut into short pieces, and thereby prevented from littering the ground, and enabling them to be readily plowed under.

Having thus described my invention, I claim—

1. The combination, in a cornstalk-cutter, of the frame, the stationary cutter L, and the rotating cutter I, having the curved arms adapted to sweep across the face of the cutter L, the said cutters being arranged transversely on the frame, substantially as described.

2. The combination of the frame A, having the longitudinal shaft F, carrying the rotating cutter I, the vertical cutter L, depending from the frame, the said cutters being arranged transversely on the frame, and mechanism for rotating the shaft F as the machine advances, substantially as described.

3. The combination of the frame A, having the vertical transverse cutter L, with the shaft B, journaled transversely to the frame A, and carrying the driving and supporting wheels and the gear-wheel E, and the longitudinal shaft F, journaled to the frame A and having the pinion H, meshing with the wheel E, and the cutter I, having the curved arms adapted to sweep across the face of the cutter L, for the purpose set forth, substantially as described.

In testimony that I claim the foregoing as my own I have hereto affixed my signature in presence of two witnesses.

WILLIAM R. STAFFORD.

Witnesses:
JACOB A. RHOADS,
GEO. F. PAGE.